Jan. 3, 1956
R. BAYES ET AL
2,729,558
SILVER BRAZING ALLOYS
Filed May 3, 1952
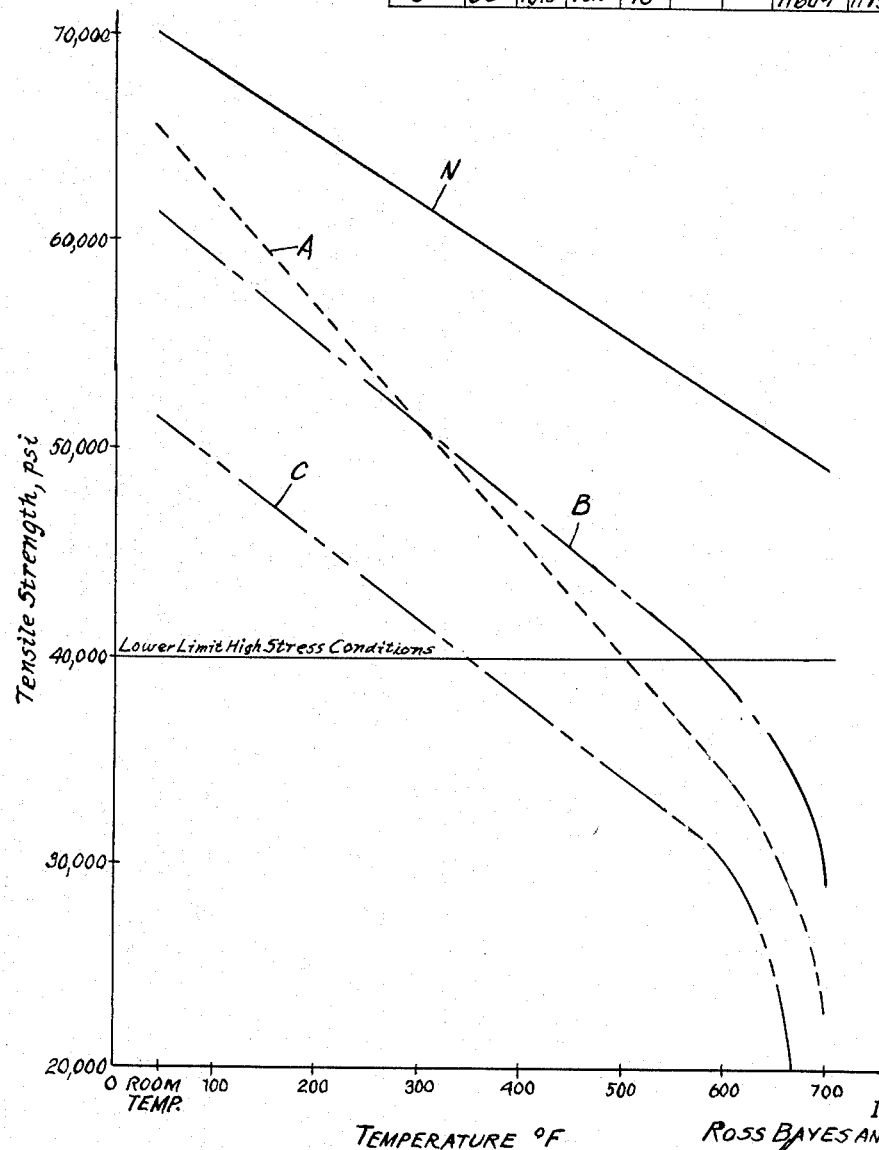
INVENTORS
ROSS BAYES AND HENRY AULL
BY
ATTORNEY.

United States Patent Office 2,729,558
Patented Jan. 3, 1956

2,729,558

SILVER BRAZING ALLOYS

Ross Bayes, Basking Ridge, and Henry B. Aull, Livingston, N. J., assignors to The American Platinum Works, Newark, N. J., a corporation of New Jersey Application May 3, 1952, Serial No. 285,932

16 Claims. (Cl. 75—134)

This invention relates to the manufacture and production of silver solders or silver brazing alloys for joining metals and particularly to that group of silver brazing alloys commonly considered to be low temperature alloys and having flow points (liquidus) within the range of from 1145° F. to 1325° F.

As is commonly known, silver alloys which are particularly well adapted to be employed for soldering or bonding purposes must have certain characteristics and must overcome certain problems which are not to be found in the art relating to the use of silver alloys which are peculiarly adapted to being mechanically worked into articles such as silverware, jewelry, coins, etc. Such problems peculiar to soldering alloys for example, include, white color (i. e., when solders are used for joining shop-fronts, fittings, hollow ware, etc., and where sightly joints are desired), degree of flow (i. e., they must run freely when used with a suitable flux), porosity of the joints, wettability of surfaces to be joined, low melting point, narrow melting range, etc. Also, the silver solder alloy must make a sound metallurgical bond with the base metal or metals being joined.

The present invention is also concerned with providing alloys that meet these latter qualifications and the new soldering alloys accordingly give satisfactory results although we are not at all concerned with color but rather are particularly concerned with the problem encountered wherein a silver solder is used in joints simultaneously subject to high stresses and high temperatures. Under such conditions suitably designed joints made with the silver brazing alloys of the invention when applied to high pressure steam lines, autoclaves, boilers, turbine blades, jet engine assemblies, electric heater terminals, immersion heaters, resistor elements, furnace equipment, temperature measuring devices, etc. have proven to be strong and highly resistant to shock and vibration which is contrary to what can be expected with previously known low temperature brazing alloys. In such high temperature installations stresses of the order of 40,000–50,000 p. s. i. are not uncommon.

The prior art, as indicated by pages 205–206 of the book "Silver in Industry," by Lawrence Addicks, 1940 ed., states that the tests on high pressure steam lines indicate that 450° F. is the limit of temperature to which joints made with silver brazing alloys should be subjected in order to provide a reasonable factor of safety. Furthermore, in an article on "Ag-Cu-Zn (Cd-Sn) brazing alloys," appearing on page 1113 in the 1948 edition of the Metals Handbook, in discussing the fact that the strength of silver brazing alloys declines rapidly at elevated temperatures, it is stated that short-time tests indicate that the loss in strength at 400–450° F. will approximate 20 to 30% of the strength at room temperature and 50% at 600° F. and that service tests of longer duration indicate that 400° F. is about the limit for the use of the known silver brazing alloys, unless the type of joint allows for an unusually large factor of safety. Also, as recent as March 1952, in an article appearing in Materials and Methods, pages 106–120, and particularly on page 109, the editor H. R. Clauser indicates that the tensile strength of the known low melting point silver brazing alloys is about one-half the room temperature strength when the temperature is raised from 70° F. to 500° F.

On the other hand, as indicated in greater detail hereinafter, we have found that joints made with the new solder alloy have given satisfactory results on high pressure steam lines at temperatures that are as much as 50% higher than those previously thought to be within the limits of reasonable safety factors.

It is an object of the invention to produce silver alloys particularly suitable for use as a silver solder and having high tensile strength at elevated temperatures. It is a further object of the invention to produce silver solder alloys having high tensile strength and which can be used to produce solder joints capable of withstanding high temperatures and high pressures for long periods of time. A still further object of the invention is to produce low temperature silver solder alloys approaching a eutectic composition so that little or no melting range exists, enabling the alloy to transform quickly during heating from the solid to the liquid state at one temperature and flow freely and quickly when used as solders at temperatures below 1325° F., and permitting such alloys to be used in producing solder joints having high tensile properties at high temperatures with a minimum of heat and a minimum of working time required for the joining operation.

Other objects and advantages of the invention will be more fully described hereinafter and particularly pointed out in the appended claims, reference being had to the accompanying drawing forming part of this specification, and in which a graph is shown depicting the tensile strength of a solder joint made with an alloy of the invention as compared with other typical low temperature alloys well known in the art.

Heretofore, it was known that the addition of silver to binary Cu-Zn alloys lowers the melting point and thus ternary alloys of silver, copper and zinc in varying proportions have been widely used for many years as brazing alloys. Quaternary alloys have also been used having varying percentages of cadmium or tin, as well as silver, copper and zinc. The flow point (liquidus temperature) of these alloys range from approximately 1145° F. to 1600° F. and the melting point (solidus temperatures) may range as much as 300° F. below the flow points. If this temperature differential between the solidus and liquidus or melting range is too large, the material will go through a mushy state before reaching the highest degree of fluidity. Moreover the phenomenon of liquation may occur, i. e. the separating out of liquid constituents of the alloy while within the melting range, thus leaving a very high melting "skull." The prior art has therefore attempted, where possible, to produce binary, ternary and quaternary alloy compositions having a flow point almost identical with the melting point. For instance, the silver-copper eutectic, which contains 72% Ag, 28% Cu, melts at 1434° F. which is the temperature of the flow point. In many cases, silver solders have been developed from the binary Ag-Cu eutectics with the addition of Zn or other constituent to produce a ternary alloy of a still lower melting point and narrow melting range.

We have determined that the addition of a substantial amount of manganese to a Ag-Cu-Zn alloy results in a solder alloy capable of producing strong joints of high tensile strength and which offer high resistance to fatigue and by properly proportioning the constituents (as hereinafter explained in greater detail) we have been able to obtain an eutectic type of alloy.

Since the brazing metal must melt and flow readily at a temperature lower than the melting point of the base metal or metals to be joined, it is necessary to provide a reasonable temperature or working differential between the flow point of the solder alloy and the melting point of the base metal being joined. This lower solder melting point has the additional advantage of shortening the time required for making the joints and avoids other metallurgical problems such as distillation of Zn from brass, intergranular attack of stainless steels by the brazing alloy, carbide precipitation in stainless steels, excessive diffusion of the brazing alloy into the base metal and excessive dilution of the brazing alloy by the base metal. Therefore, when using solders to provide joints capable of prolonged use at high temperatures and pressures, we found that the melting point of the brazing alloy should not exceed 1325° F. This is highly desirable especially for furnace brazing operation where cost of furnace maintenance may be made prohibitive with the use of higher melting point alloys.

A number of suitable compositions for alloys according to this invention are given in the table below together with their melting range. The invention is not, however, restricted to the particular examples given in the table. The alloy numbers represent the relative order in which these alloys were prepared.

Table

| Alloy No. | Percentage Composition | | | | Melting Range In ° Fahrenheit | |
|---|---|---|---|---|---|---|
| | Ag | Cu | Mn | Zn | Solidus | Liquidus |
| 10 | 45 | 27.5 | 10 | 17 | 1,282 | 1,287 |
| 3 | 43 | 30 | 14 | 13 | 1,287 | 1,287 |
| 5 | 45 | 30 | 11 | 14 | 1,287 | 1,287 |
| 4 | 45 | 28 | 14 | 13 | 1,294 | 1,294 |
| 1 | 45 | 30 | 13 | 12 | 1,298 | 1,298 |
| 6 | 45 | 30 | 15 | 10 | 1,300 | 1,300 |
| 2 | 47 | 28 | 13 | 12 | 1,285 | 1,308 |
| 7 | 45 | 25 | 10 | 20 | 1,285 | 1,308 |
| 11 | 40 | 30 | 16 | 14 | 1,292 | 1,313 |
| 9 | 40 | 33.5 | 16.5 | 10 | 1,300 | 1,315 |

As evidenced above we prepared several alloys which proved to be eutectic compositions, e. g. alloys Nos. 3, 5, 4, 1 and 6.

However, the specific constituents of these and the other alloys of our invention were not at all predictable from prior knowledge in the art. For example, those familiar with known silver brazing alloys and the effect of additions of zinc thereon would expect that in quaternary alloys of silver, manganese, copper and zinc, any appreciable decrease in the percentage of zinc at the expense of any of the other three metals would result in a raising of the flow-point of the alloy. However, we found that the alloys of our invention gave results that were contra to what would be expected from a knowledge of the prior art, since a comparison of alloy 7 with alloys 4, 1, and 10 (all of which have appreciably less zinc content than 7) shows that the latter three alloys have nevertheless appreciably lower flow-points than alloy 7.

According to this invention, therefore, silver solders having all the desired characteristics as indicated above and including eutectic alloys having slight melting ranges with no undesirable effects in many brazing operations which we would consider to be eutectic type or near eutectic type alloys, are produced by alloying silver with copper, zinc and manganese, wherein the silver is present in from 40 to 50 per cent, the copper constitutes from 25 to 35 per cent, the zinc constitutes from 10 to 20 per cent, and the manganese constitutes from 10 to 17 per cent. Furthermore, where primarily eutectic type alloys are desired the composition of the alloys should be from 43–47% silver, from 27–31% copper and from 10–15% each of manganese and zinc. When any of these ranges are exceeded it has been found that the alloys become unworkable or have undesirably large melting ranges.

We are aware that it has been suggested that manganese in amounts up to 20 per cent be alloyed with silver and copper to provide alloys for use in brazing metals. However, it has been found that such ternary alloys are not suitable for low temperature brazing of joints which will later be subjected to a combination of high temperatures and high stresses.

The tensile strength property at high temperatures is indicated in the graph for the new alloy composition (designated N) of 45% Ag, 30% Cu, 12% Zn and 13% Mn and a comparison is made with three known alloys all having melting points (solidus temperatures) below 1325° F. Since many of the high temperature and high stress uses of solder joints must be capable of withstanding at least 40,000 p. s. i. as a lower limit of high stress conditions for extended periods, it is readily seen that composition C (50% Ag, 15.5% Cu, 16.5% Zn and 18% Cd) can be subjected to this use only up to about 365° F., composition A (40% Ag, 30% Cu, 28% Zn and 2% Ni) can withstand up to approximately 500° F., and composition B (50% Ag, 15.5% Cu, 15.5% Zn, 16% Cd and 3% Ni) can withstand up to approximately 580° F. These latter values do not account for any factors of safety. A joint made with an alloy of the invention, indicated as N on the graph, on the other hand, under 40,000 p. s. i. has been capable of withstanding temperatures about 700° F., with a reasonable factor of safety or in other words a temperature that is 50% above that considered to be safe with the prior known alloys, as indicated by the prior art listed above.

The alloys made according to this invention have melting points between 1284° F. and 1300° F. and in order to obtain a eutectic type of alloy we have determined that it is preferable to maintain the combined manganese and zinc content between about 25–30 per cent when the combined manganese and silver content is between about 55–60 per cent. We have also found it to be preferable to maintain the combined copper and silver content at about 70–75 per cent when the combined content of copper and zinc is between about 40 to 45 per cent.

If the manganese content be increased above about 17% and the zinc content be increased above about 20%, the flow point of the brazing alloy increases rapidly thus producing a wide melting range which, as indicated, is highly undesirable.

The alloys according to our invention should be substantially free from other substances, but may contain small quantities of other substances such as Pb, Li, Si, Al, etc., which are quite frequently used as deoxidizers as long as the fundamental characteristics of our solder alloys are not substantially altered in a detrimental manner.

The foregoing disclosure is to be regarded as descriptive and illustrative only, and not as restrictive or limitative of the invention, of which obviously embodiments may be considered, without departing from the general scope herein indicated and denoted in the appended claims.

Having thus described our invention, what we claim as new and desire to secure by Letters Patent, is:

1. An alloy especially suited for uniting base metals for producing a joint capable of withstanding high stresses and temperatures comprising 25% to 35% copper, a minimum of 10% zinc and 10% to 17% manganese, with the sum of the manganese and zinc content being approximately 25–30%, and 40% to 50% of silver, said copper, zinc, manganese and silver essentially constituting all of the alloy.

2. A silver base solder alloy composed of 25% to 35% copper, a minimum of 10% zinc, with 10% to 17% manganese, and the balance being essentially silver, where the sum of the manganese and zinc content is approximately 25–30%, and the combined manganese and silver content is between about 55–60% of the alloy.

3. A silver base solder alloy composed of 25% to 35% copper, 10% to 17% manganese, with a minimum of 10% zinc, and the balance being essentially silver, where the sum of the copper and zinc content is approximately 40–45%, and where the sum of the copper and silver content is about 70 to 75%.

4. A silver base solder alloy consisting of 25% to 35% copper, 10% to 20% zinc, with 10% to 17% manganese, where the sum of the manganese and zinc content is approximately 25–30%, and the balance being silver.

5. A low temperature silver base solder alloy consisting of 25% to 35% copper, 10% to 20% zinc, with 10% to 17% manganese, where the sum of the manganese and zinc content is approximately 25–30% and the balance being essentially formed of 40% to 50% silver, whereby a joint formed with said alloy is capable of safely withstanding temperatures up to 700° F. at high stresses.

6. A silver base solder alloy for producing a joinder of base metals capable of safely withstanding temperatures up to 700° F. at high stresses formed of 25% to 35% copper, with a minimum of 10% zinc, 40% to 50% silver and 10% to 17% manganese where the sum of the manganese and zinc content is approximately 25–30%, and where the sum of the silver plus manganese content is between about 55–60%.

7. A silver base solder alloy characterized by high strength containing 25% to 35% copper, 10% to 20% zinc, 10% to 17% manganese, and the balance consisting essentially of silver but not less than 40%.

8. A low temperature silver solder alloy consisting of 40% to 50% silver, 25% to 35% copper, 10% to 20% zinc, and 10% to 17% manganese, whereby a joint produced with said solder is capable of withstanding high stresses and temperatures up to 700° F.

9. A quaternary silver solder alloy consisting of approximately 44% silver, approximately 29% copper, a minimum of 10% zinc, with manganese, wherein the combined manganese and zinc content is approximately 25–30%.

10. A quaternary silver solder alloy consisting of about 44% silver, 10% to 20% zinc, with the balance being essentially copper and maganese, wherein the combined manganese and zinc content is approximately 25–30% and the combined zinc and copper content is between about 40–45%.

11. A eutectic type quaternary silver solder alloy consisting of 45% silver, 30% copper, 12% zinc and 13% manganese.

12. A eutectic type quaternary silver solder alloy consisting of 45% silver, 28% copper, 13% zinc and 14% manganese.

13. A eutectic type quaternary silver solder alloy consisting of 45% silver, 30% copper, 14% zinc and 11% manganese.

14. A eutectic type quaternary silver brazing alloy consisting of 43% silver, 30% copper, 14% manganese and 13% zinc.

15. A eutectic type of quaternary silver brazing alloy consisting of 45% silver, 30% copper, 15% manganese and 10% zinc.

16. A silver base solder alloy composed of 25% to 35% copper, a minimum of 10% zinc, and 10% to 17% manganese, with the sum of the manganese content and the zinc content being approximately 25 to 30%, and the balance being silver, wherein the silver constitutes at least 40% of said alloy composition.

References Cited in the file of this patent

UNITED STATES PATENTS

| | | |
|---|---|---|
| 2,019,984 | Leach | Nov. 5, 1935 |
| 2,138,637 | Leach | Nov. 29, 1938 |
| 2,138,638 | Leach | Nov. 29, 1938 |
| 2,196,302 | Hensel et al. | Apr. 9, 1940 |
| 2,196,303 | Hensel et al. | Apr. 9, 1940 |
| 2,235,634 | Hensel et al. | Apr. 9, 1940 |
| 2,487,453 | Leach | Nov. 8, 1949 |